July 25, 1961 W. J. WILSON 2,994,083
HIGH-FREQUENCY TRANSMISSION LINE COUPLING DEVICE
Original Filed Oct. 5, 1955 3 Sheets-Sheet 1

William J. Wilson
*INVENTOR.*

Robert O. Richardson
attorney

July 25, 1961 W. J. WILSON 2,994,083
HIGH-FREQUENCY TRANSMISSION LINE COUPLING DEVICE
Original Filed Oct. 5, 1955 3 Sheets-Sheet 2

William J. Wilson
INVENTOR

William J. Wilson
INVENTOR.

United States Patent Office 2,994,083
Patented July 25, 1961

2,994,083
HIGH FREQUENCY TRANSMISSION LINE COUPLING DEVICE
William J. Wilson, Nashua, N.H., assignor to Sanders Associates, Inc., Nashua, N.H., a corporation of Delaware
Continuation of application Ser. No. 538,559, Oct. 5, 1955. This application May 24, 1960, Ser. No. 31,473
4 Claims. (Cl. 343—767)

The present invention is directed to a high-frequency transmission line coupling device and, more specifically, to such a device for coupling a rectangular type of high-frequency transmission line to a circular wave guide for the purpose of, for example, wave translation, radiation or phase delay. As used herein, the expression circular wave guide is not intended to be limited to the conventional, hollow cylindrical line having a single metallic cylindrical member but is intended to cover all types of lines cylindrical in form.

Flat-strip or planar coaxial transmission lines are now well known and widely used. However, other conventional lines such as circular wave guides are also extensively used, for example, as resonators, gyrators and radiators. Consequently, these arise problems of coupling energy from a flat-strip line to a circular line and conversely from a circular line to a flat-strip line. The high-frequency transmission line in accordance with the present invention is directed to the solution of this coupling problem.

It is therefore an object of the present invention to provide a new and improved high-frequency transmission line coupling device for coupling a planar line to a circular wave guide.

It is another object of the present invention to provide a simple and inexpensive high-frequency transmission coupling device.

In accordance with the present invention a high frequency transmission line coupling device comprises a transmission line having a pair of outer conductors and an inner conductor between and spaced from the outer conductors. The coupling device also includes a circular wave guide having a slot in the surface thereof. The aforesaid pair of outer conductors are positioned in contact with the surface of the circular wave guide in proximity to a pair of opposite sides of the slot and the inner conductor of the transmission line extends through the slot into the wave guide and is curved about the longitudinal axis of the wave guide.

For a better understanding of the present invention, together with other and further objects thereof, reference is made to the following description taken in connection with the accompanying drawings and its scope will be pointed out in the appended claims.

Figure 1:
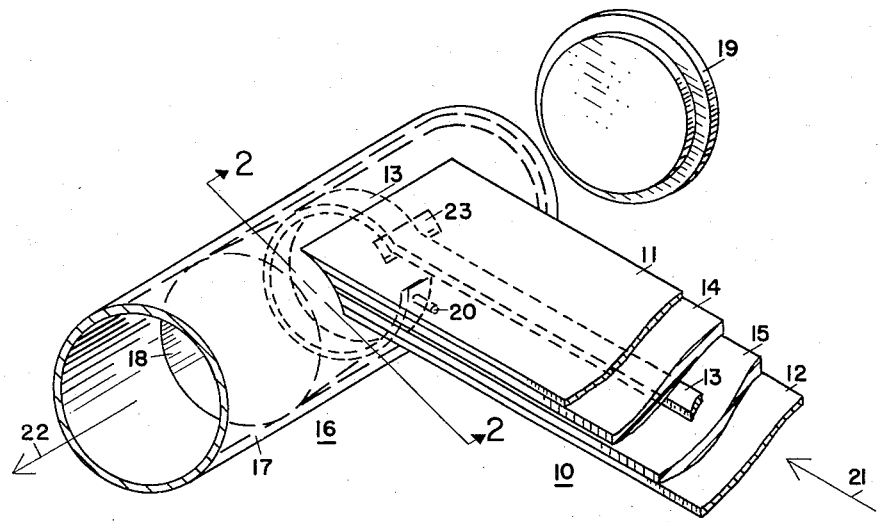
Figure 2:
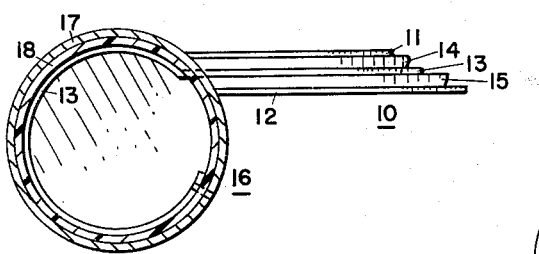
Figure 3:
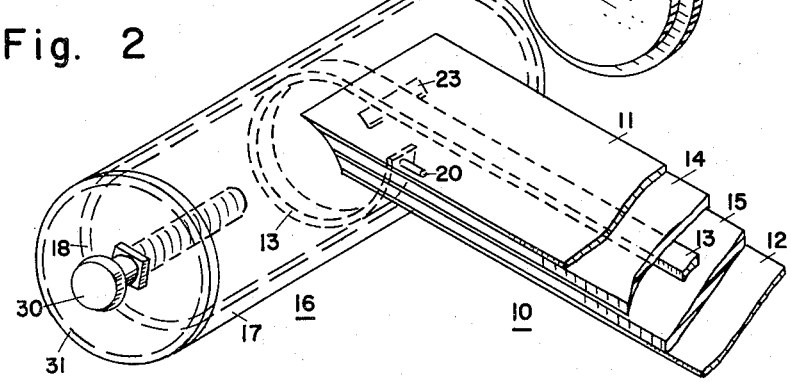
Figure 4:
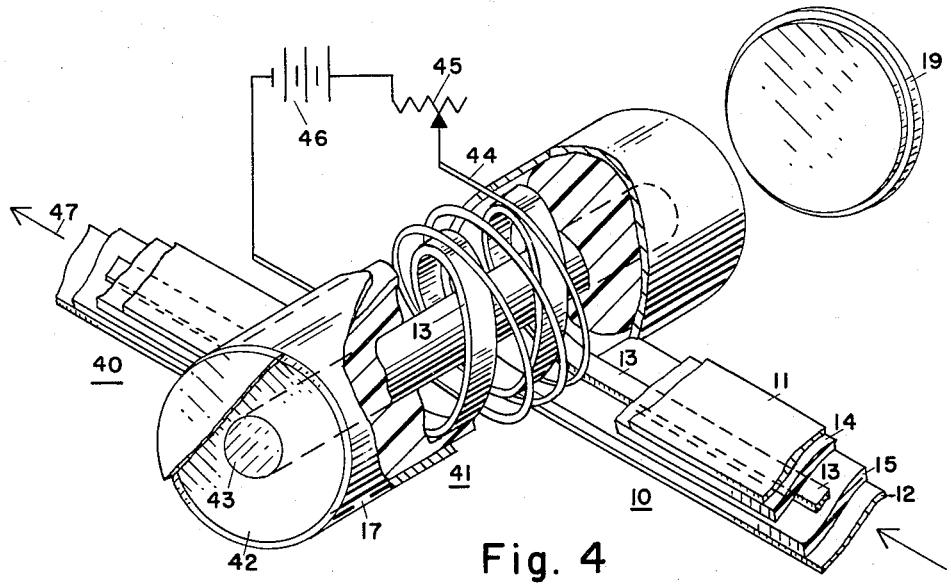
Figure 5:
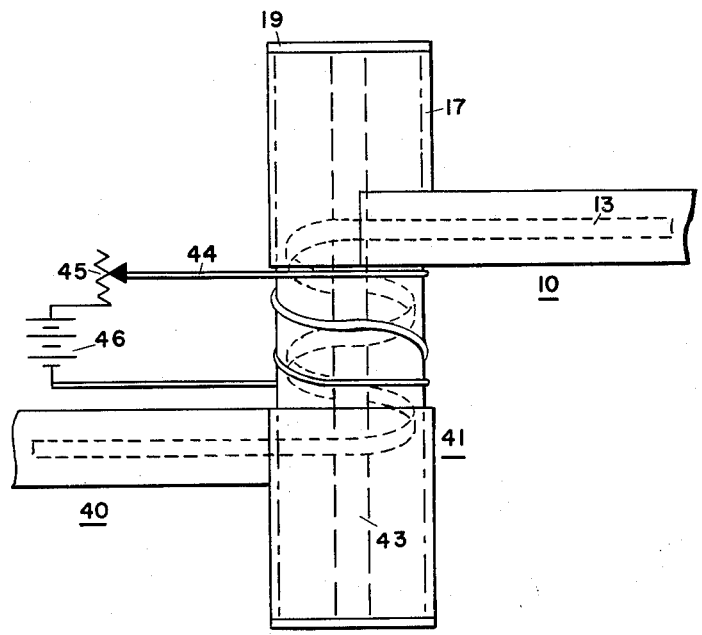
Figure 6:
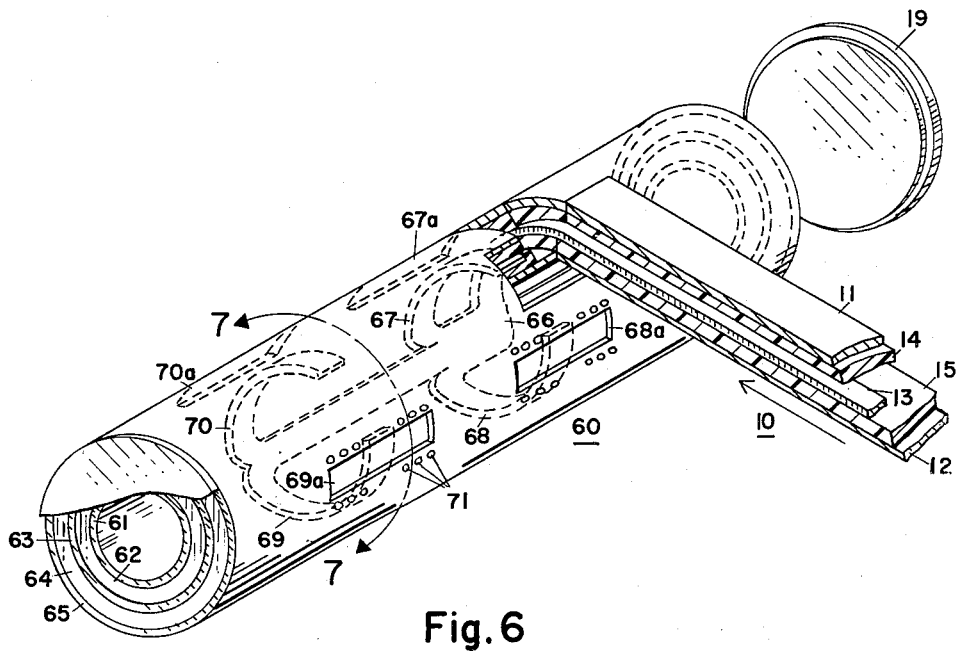
Figure 7:
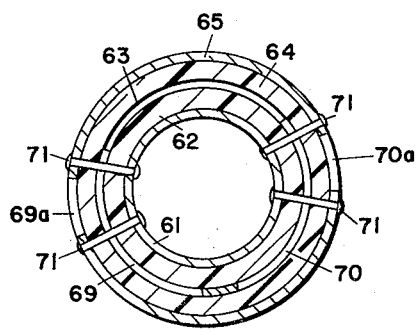

In the drawings:
FIG. 1 is a representation of a high-frequency transmission line coupling device in accordance with the present invention shown in a partially fragmentary and paritally exploded view;
FIG. 2 is a cross-sectional view of the high-frequency transmission line coupling device of FIG. 1 taken along the line 2—2 of FIG. 1;
FIG. 3 is a resonator embodying a coupling device of the type represented in FIG. 1;
FIG. 4 is a gyrator embodying another form of a coupling device in accordance with the present invention;
FIG. 5 is another view of the gyrator of FIG. 4;
FIG. 6 is an antenna utilizing still another form of a coupling device in accordance with the present invention; and
FIG. 7 is a cross-sectional view of the circular wave guide of FIG. 6, taken along the line 7—7.

*Description and explanation of operation of the coupling device in FIGS. 1 and 2*

Referring now to the high-frequency transmission line coupling device of FIGS. 1 and 2, component 10 is a transmission line of the flat-strip type having a pair of outer conductors 11 and 12 and an inner conductor 13 between and spaced from the outer conductors. The desired spacing is provided by dielectric material 14 between the conductors 11 and 13 and dielectric material 15 between the conductors 12 and 13.

The high-frequency transmission line coupling device also includes a circular wave guide 16 having a slot 23 in the surface thereof. The circular wave guide comprises a cylindrical outer metallic member 17 and a cylindrical dielectric member 18 concentric with the member 17 and having an outer circumference substantially equal to the inner circumference of the member 17. The wave guide 16 also includes a metallic end cap 19 for enclosing one end thereof. The cap 19 provides a short-circuited reflector for the guide 16 and is positioned at a distance of an integral multiple of one-half wavelength from the center of the slot 23.

The pair of outer conductors 11 and 12 are positioned in contact with the surface of the metallic tube 17 in proximity to a pair of opposite sides, specifically the longer sides of the slot 23 in the wave guide 16. The inner conductor 13 extends through the slot 23 into the wave guide 16 and is curved about the longitudinal axis of the wave guide. As shown, the inner conductor 13 is formed into an incomplete circle with the circumference of the circle substantially equal to the circumference of the inner wall of the dielectric tube 18. It will be understood that the curve formed by the conductor 13 need not describe a circle but may take any of many forms, for example, a helix, as long as it at least partially closes the longitudinal axis of the wave guide. The remote end of the conductor 13 in the wave guide 16 is electrically connected to the metallic tube 17 by means of a shorting pin 20.

Considering now the operation of the coupling device of FIGS. 1 and 2, waves having a TEM mode of propagation are translated along the transmission line 10 in the direction indicated by the arrow 21. The grounded or shielding conductors 11 and 12 are in electrical contact with the cylindrical conductor 17 of the wave guide 16 to provide a continuous grounded plane for the wave translated along the inner conductor 13. This wave is translated into the interior of the shell 17 through the slot 23 and formed, for example, into a wave of $TE_{11}$ mode for translation along the wave guide 16 in the direction of the arrow 22. The encircling of the conductor 13 within the wave guide 16 facilitates the development of a desired mode. The spacing between the conductor 13 and the end plate 19, being an integral multiple of half-wave lengths, assures proper phasing of both the directly translated waves and waves reflected from the plate 19.

*Description and explanation of operation of the resonator of FIG. 3*

In FIG. 3 there is represented a high-frequency resonator employing a coupling device such as described with reference to FIGS. 1 and 2. Since many of the elements in the embodiments of FIGS. 1 and 3 are the same, these are indicated by identical reference numerals in both figures.

The circular wave guide in FIG. 3 is a tunable resonant chamber for waves coupled into it by means of the transmission line 10. As a resonant chamber it includes a metallic member 30 movable axially along the interior of the cylinder 17 to resonate the wave guide 16 over a range of frequencies. As in conventional resonators, the resonant frequency is determined by the physical positioning of the member 30 along the axis of the guide 16 with respect to the inserted conductor 13. Of course, as will be readily seen, if a wider tuning range is desired the end walls 19 and 31 could also be made movable along the axis of the wave guide and could be mechanically linked to move simultaneously.

*Description and explanation of operation of the gyrator of FIGS. 4 and 5*

FIGS. 4 and 5 represent different views of a gyrator including the coupling principles of the coupling device described with reference to FIGS. 1 and 2. Again, since many of the elements in the gyrator of FIG. 4 correspond to elements in the coupling device of FIG. 1, identical elements are represented by the same reference numerals in both figures.

A gyrator includes a microwave transmission line having an electrical length 180° longer in one direction than in the other and provides a means for obtaining differential phase shifts in the waves translated through the transmission line. The gyrator of FIG. 4 includes not only the flat-strip transmission line 10 corresponding to the transmission line 10 of FIG. 1, but also includes another flat-strip transmission line 40 similarly coupled to a circular wave guide 41. The guide 41 is similar to the wave guide 16 of FIG. 1 except for the arrangement of conductors and dielectric material within the interiors of the guides. The interior of the wave guide 41 includes a solid dielectric material 42, such as a foam plastic of the form of alkyl-isocyanate, filling the space between the interior of the outer metallic shell 17 and the outer surface of a ferrite rod 43 coaxial with the shell 17. The inner conductor 13 of the transmission line 10 is formed into a helix having its longitudinal axis concentric with that of the ferrite rod 43 and makes electrical contact with the inner conductor of the transmission line 40. The helix formed by the inner conductor 13 is held in spaced, insulated position with respect to the inner wall of the shell 17 and the outer surface of the ferrite rod 43 by the Polyfoam dielectric material 42. A magnetizing winding 44 is energized by a battery 46 through a potentiometer 45 magnetically coupled to the ferrite rod 43 to develop an axial magnetic field in the rod 43. The strength of the developed field is adjustable by means of the potentiometer 45.

As in conventional gyrators, a wave translated along the transmission line 10 is transformed into a circularly polarized wave within the circular wave guide 41 by means of the helical winding of the conductor 13. This wave is coupled, after translation through the guide 41, by means of the end of the conductor 13 remote from the transmission line 10 into the transmission line 40, wherein it is translated in the direction indicated by the arrow 47. The velocity of the translation of the wave along the helix within the interior of the circular wave guide 41 is adjustable in the well-known manner for gyrators by varying the strength of the axial magnetic field in the ferrite rod 43. The velocity of the wave varies inversely as the strength of the magnetic field. Consequently by adjusting the strength of the magnetic field, the wave translated from the transmission line 10 through the wave guide 41 and into the transmission line 40 can be controlled in phase over a desired range of phase delays.

*Description and explanation of operation of antenna of FIGS. 6 and 7*

The antenna of FIGS. 6 and 7 employs a flat-strip transmission line, similar to those represented in the prior figures, for feeding a circular wave guide, which differs from those in the prior figures in that it comprises at least a pair of concentric, metallic cylinders. The wave guide 60 includes a pair of end caps such as represented by the cap 19 and, in the order named from the interior thereof to the exterior, an inner, metallic cylinder 61 conductively connected to the conductor 12 of the transmission line 10, a cylinder of dielectric material 62, an intermediate conductive member 63 to be described more fully hereinafter, another cylinder of dielectric material 64 and outer metallic cylinder 65 connected to the conductor 11 of the line 10. The center of the wave guide 60 may be devoid of material and serve as a conventional circular wave guide for another wave or may include dielectric material as desired.

The intermediate conductive member 63 is formed into a series of feeder and branch conductors. The base of the feeder 66 is connected to the intermediate conductor 13 of the transmission line 10 and the ends of the branch conductors 67–70, inclusive, remote from the feeder 66 terminate in radiating members opposite slots 67a–70a, inclusive, formed in the dielectric cylinder 64 and the outer metallic cylinder 65. Metallic pins 71 conductively connect the metallic cylinders 61 and 65 around the periphery of each of the slots 67a–70a, in order to develop the proper impedance condition to effect radiation. The feeder and branch lines are of such relative dimensions in both width and length, with respect to each other and with respect to the conductor 13 of the transmission line 10, as to provide proper impedance matches and phasing for the signal applied thereto. In this way, properly phased radiation occurs from the slots 67a–70a, inclusive. Though only four branch conductors and four cooperating slots are shown in FIG. 6, it will be readily understood that the number of branch conductors and slots is limited only by the radiation pattern desired.

Considering now the operation of the antenna of FIG. 6, a high-frequency wave is translated along the transmission line 10 in the direction of the arrow. The wave is applied to the feeder 66 within the wave guide 60 and is conducted along this feeder and into the branch conductors 67–70, inclusive. Waves properly phased with respect to each other are radiated through the slots 67a–70a, inclusive, to provide a desired radiation pattern. If, as mentioned above, a second wave is translated along the interior of the internal cylinder 61, it may also be radiated to provide a second radiated wave by placing properly dimensioned and phased slots coupling the interior of the cylinder 61 through the dielectric materials 62 and 64 and the metallic cylinders 63 and 65. For example, the wave translated along the interior of the cylinder 61 may be X-band while that coupled from the transmission line 10 to the slots 67a–70a, inclusive, is for example, S-band. These waves would require different size slots, would not intercouple and could provide both search and track beams for the same antenna.

There has been described herein simple and novel high-frequency transmission line coupling devices for coupling a flat-strip transmission line to different types of circular wave guide. In addition, there have been described high frequency devices utilizing the simple and novel coupling arrangement for a few of the many purposes to which such arrangement is adaptable. It will be understood that the embodiments described are by no means a complete collection of all of the embodiments that might be described.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

The present invention is a continuation of my co-pending application filed October 5, 1955, Serial No. 538,559, directed to a High Frequency Transmission Line Coupling Device.

What is claimed is:

1. A high-frequency, transmission line, coupling device for a wave radiator, comprising: a transmission line having a pair of elongated, plane, outer conductors providing ground planes and an elongated, plane, inner conductor for carrying signal current, said inner conductor being narrower than said outer conductors and disposed in insulated spaced relation between and in parallel with said outer conductors; and an elongated, hollow, wave guide having an axially oriented input slot and a plurality of output radiating slots formed in the wall thereof, said pair of outer conductors being positioned in contact with the outer surface of said guide in proximity to a pair of opposite sides of said input slot, and said inner conductor extending through said slot into said wave guide and curved about the longitudinal axis of said guide in coupling proximity with said radiating slots, the flat sides of said inner conductor being parallel to said axis.

2. A high-frequency, transmission line, coupling device for a wave radiator, comprising: a transmission line having a pair of elongated, plane, outer conductors providing ground planes and an elongated, plane, inner conductor for carrying signal current, said inner conductor being narrower than said outer conductors and disposed in insulated spaced relation between and in parallel with said outer conductors; and an elongated, hollow, wave guide having an axially oriented input slot and a plurality of output, radiating slots formed in the wall thereof, said pair of outer conductors being positioned in contact with the outer surface of said guide in proximity to a pair of opposite sides of said slot, and said inner conductor extending through said input slot into said wave guide and having branches curved about the longitudinal axis of said guide each in coupling proximity with one of said radiating slots, the flat sides of said inner conductor being parallel to said axis.

3. A high-frequency, transmission line, coupling device for a wave radiator, comprising: a transmission line having a pair of elongated, plane, outer conductors providing ground planes and an elongated, plane, inner conductor for carrying signal current, said inner conductor being narrower than said outer conductor and disposed in insulated spaced relation between and in parallel with said outer conductors; and an elongated, hollow, circular wave guide having an axially oriented input slot and a plurality of output, radiating slots formed in the wall thereof, said pair of outer conductors being positioned in contact with the outer surface of said guide in proximity to a pair of opposite sides of said input slot, and said inner conductor extending through said slot into said wave guide and annularly curved about the longitudinal axis of said guide in coupling proximity with said radiating slots, the flat sides of said inner conductor being parallel to said axis.

4. A high-frequency, transmission line, coupling device for a wave radiator, comprising: a transmission line having a pair of elongated, plane outer conductors providing ground planes and an elongated, plane, inner conductor for carrying signal current, said inner conductor being narrower than said outer conductors and disposed in insulated spaced relation between and in parallel with said outer conductors; and an elongated, hollow, circular wave guide having an axially oriented input slot and a plurality of output, radiating slots formed in the wall thereof, said pair of outer conductors being positioned in contact with the outer surface of said guide in proximity to a pair of opposite sides of said slot, and said inner conductor extending through said input slot into said wave guide and having branches annularly curved about the longitudinal axis of said guide each in coupling proximity with one of said radiating slots, the flat sides of said inner conductor being parallel to said axis.

No references cited.